United States Patent [19]

Gopalakrishna et al.

[11] Patent Number: 5,645,681
[45] Date of Patent: Jul. 8, 1997

[54] STACKED ROTARY ACOUSTIC HORN

[75] Inventors: Haregoppa S. Gopalakrishna; Satinder K. Nayar, both of Woodbury, Minn.

[73] Assignee: Minnesota Mining and Manufacturing Company, St. Paul, Minn.

[21] Appl. No.: 676,050

[22] Filed: Jul. 5, 1996

[51] Int. Cl.⁶ .................................................. B29C 65/08
[52] U.S. Cl. ................... 156/580.2; 156/73.1; 425/174.2
[58] Field of Search ........................ 156/73.1, 555, 156/580, 580.1, 580.2; 425/174.2; 228/110.1, 1.1

[56] References Cited

U.S. PATENT DOCUMENTS

| | | | |
|---|---|---|---|
| 4,252,586 | 2/1981 | Scott | 156/73.1 |
| 4,404,052 | 9/1983 | Persson et al. | 156/73.1 |
| 4,473,432 | 9/1984 | Leader et al. | 156/582 |
| 4,534,818 | 8/1985 | Kreager et al. | 156/466 |
| 4,659,614 | 4/1987 | Vitale | 428/218 |
| 4,668,316 | 5/1987 | Sager | 156/73.1 |
| 4,681,645 | 7/1987 | Fukushima et al. | 156/73.1 |
| 5,057,182 | 10/1991 | Wuchinich | 156/580.1 |
| 5,087,320 | 2/1992 | Neuwirth | 156/580.2 |
| 5,096,532 | 3/1992 | Neuwirth et al. | 156/580.1 |
| 5,110,403 | 5/1992 | Ehlert | 156/580.1 |
| 5,552,013 | 9/1996 | Ehlert et al. | 156/555 |
| 5,562,790 | 10/1996 | Ehlert et al. | 156/73.1 |

*Primary Examiner*—James Sells
*Attorney, Agent, or Firm*—Gary L. Griswold; Walter N. Kirn; Charles D. Levine

[57] ABSTRACT

A rotary acoustic horn imparts energy at a selected wavelength, frequency, and amplitude. The horn includes a base portion and a plurality of weld faces. Each weld face has a diameter that expands and contracts with the application of ultrasonic energy. The weld faces are spaced from each other and are mounted in one of series and parallel with each other.

11 Claims, 4 Drawing Sheets

STACKED ROTARY ACOUSTIC HORN

TECHNICAL FIELD

The present invention relates to acoustic welding horns. More particularly, the present invention relates to rotary acoustic welding horns.

BACKGROUND OF THE INVENTION

In acoustic welding, such as ultrasonic welding, two parts to be joined (typically thermoplastic parts) are placed directly below an ultrasonic horn. In plunge welding, the horn plunges (travels toward the parts) and transmits ultrasonic vibrations into the top part. The vibrations travel through the top part to the interface of the two parts. Here, the vibrational energy is converted to heat due to intermolecular friction that melts and fuses the two parts. When the vibrations stop, the two parts solidify under force, producing a weld at the joining surface.

Continuous ultrasonic welding is typically used for sealing fabrics, films, and other parts. In the continuous mode, typically the ultrasonic horn is stationary and the part is moved beneath it. Scan welding is a type of continuous welding in which the plastic part is scanned beneath one or more stationary horns. In transverse welding, both the table over which the parts pass and the part being welded remain stationary with respect to each other while moving underneath the horn or while the horn moves over them.

Many uses of ultrasonic energy for bonding and cutting thermoplastic materials involve ultrasonic horns or tools. A horn is an acoustical tool usually having a length of one-half of the horn material wavelength and made of, for example, aluminum, titanium, or sintered steel that transfers the mechanical vibratory energy to the part. (Typically, these materials have wavelengths of approximately 25 cm (10 in).) Horn displacement or amplitude is the peak-to-peak movement of the horn face. The ratio of horn output amplitude to the horn input amplitude is termed gain. Gain is a function of the ratio of the mass of the horn at the vibration input and output sections. Generally, in horns, the direction of amplitude at the face of the horn is coincident with the direction of the applied mechanical vibrations.

Traditionally, ultrasonic cutting and welding use horns which vibrate axially against a rigid anvil, with the material to be welded or cut being placed between the horn and anvil. Alternatively, in continuous high speed welding or cutting, the horn is stationary while the anvil is rotated, and the part passes between the horn and the anvil. In these cases, the linear velocity of the part is matched with the tangential velocity of the working surface of the rotating anvil.

There are, however, some limitations to this system. Because the part to be welded is continuously passed between the narrow gap formed by the anvil and the horn, compression variations are created due to part thickness nonuniformities. Drag exists between the part and the horn and may cause residual stresses in the welded region. These factors affect the weld quality and strength which, in turn, limit the line speeds. Also, the gap between the rotating anvil and the horn limits the compressible bulk or thickness of the parts to be bonded.

One way to minimize these limitations is to shape the working surface of the horn to attain a progressive convergent or divergent gap depending upon the part. This does not completely solve the problem of moving the material to be bonded past a stationary horn, as an intimate contact is needed for efficient acoustic energy transfer.

The best way to attain high quality and high speed ultrasonic welds is to use a rotary horn with a rotating anvil. Typically, a rotary horn is cylindrical and rotates around an axis. The input vibration is in the axial direction and the output vibration is in the radial direction. The horn and anvil are two cylinders close to each other, rotating in opposite directions with equal tangential velocities. The part to be bonded passes between these cylindrical surfaces at a linear velocity which equals the tangential velocity of these cylindrical surfaces. Matching the tangential velocities of the horn and the anvil with the linear velocity of the material is intended to minimize the drag between the horn and the material. The excitation in the axial direction is similar to that in conventional plunge welding.

U.S. Pat. No. 5,096,532 describes two classes of rotary horn. The patent compares a commercially available rotary horn, manufactured by Mecasonic-KLN, Inc. of Fullerton, Calif. (Mecasonic horn) and a rotary horn described in the '532 patent. FIG. 1 shows a Mecasonic rotary horn and FIG. 2 shows one configuration of the '532 rotary horn. One significant difference between these two types of horns is the width of the radial weld face and the uniformity of amplitude across the radial face.

The Mecasonic horn is a full wavelength horn, having a total length of about 25 cm (10 in) for aluminum and titanium horns. The axial vibration excites the cylindrical bending mode to provide the radial motion, and the mode of vibration depends on Poisson's ratio. (If the Poisson's ratio of the horn material is zero, the radial modes of vibration are not excited.) The radial motion of the weld face is in phase with the excitation, and there are two nodes (where the amplitude of vibration is zero) for the axial motion, and two nodes for radial motion. However, the amplitude of vibration is the highest at the center of the radial weld face and diminishes toward the end, resulting in uneven weld strength. The Mecasonic horn is a partially hollowed cylinder.

The '532 horn is a half wavelength horn, having a total length of about 12.7 cm (5 in) for aluminum and titanium horns. Due to the shape of the horn, the axial vibration provides the radial motion. In this horn, the mode of vibration is independent of Poisson's ratio. The radial motion of the weld face is out of phase with the excitation, and there is only one node, at the geometric center of the weld face. The amplitude of vibration is relatively uniform across the weld face. The shape of the '532 horn differs from that of the Mecasonic horn; the '532 horn is solid, and the Mecasonic horn is a partially hollowed cylinder.

There is a need for an acoustic welding configuration which can weld parts over wide width (such as greater than 12.7 cm).

SUMMARY OF THE INVENTION

A rotary acoustic horn imparts energy at a selected wavelength, frequency, and amplitude. The horn includes a base portion having an axial input end and an axial output end and a plurality of weld faces operationally connected to the base portion. Each weld face has a diameter that is greater than the diameter of the base portion and that expands and contracts with the application of acoustic energy to the input end of the base portion. The weld faces are spaced from each other and are mounted either in series or in parallel with each other.

The distance between midpoints of adjacent weld faces is at least one multiple of one-half wavelength of the horn material. The amplitude of vibration of each weld face can differ from the amplitude of vibration of adjacent weld faces.

The expansion and contraction of at least one weld face can be substantially in phase with the movement of the axial input end of the horn. Each weld face can move substantially in phase with the expansion and contraction of alternate weld faces.

The horn can be an ultrasonic horn and can include a way to change the gain at the radial weld face by changing the mass at the axial input end of the horn.

The axial length of the weld face can be up to one-half of a wavelength of the horn material. In one embodiment, the axial length of the horn can be substantially equal to one wavelength of the horn material. In this embodiment, the weld face expansion and contraction can be substantially in phase with the movement of the input end of the horn. The horn can exhibit two nodal points for axial motion. In another embodiment, the axial length of the horn can be less than or equal to one-half wavelength of the horn material. In this embodiment, the weld face expansion and contraction can be substantially out of phase with the movement of the input end of the horn. This horn can exhibit one nodal point or axial motion.

DETAILED DESCRIPTION

Figure 1:
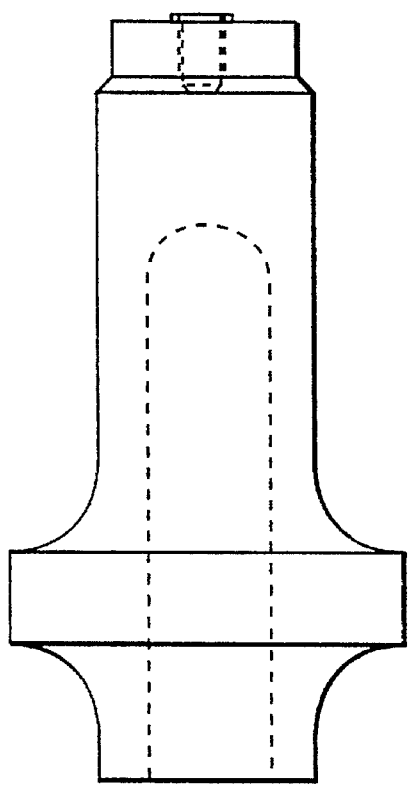
FIG. 1 is a schematic view of a Mecasonic horn.
Figure 2:
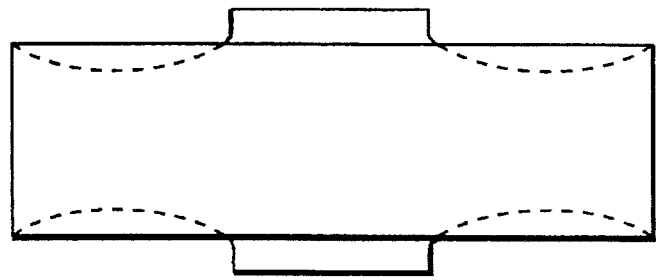
FIG. 2 is a schematic view of a '532-type horn.
Figure 3:
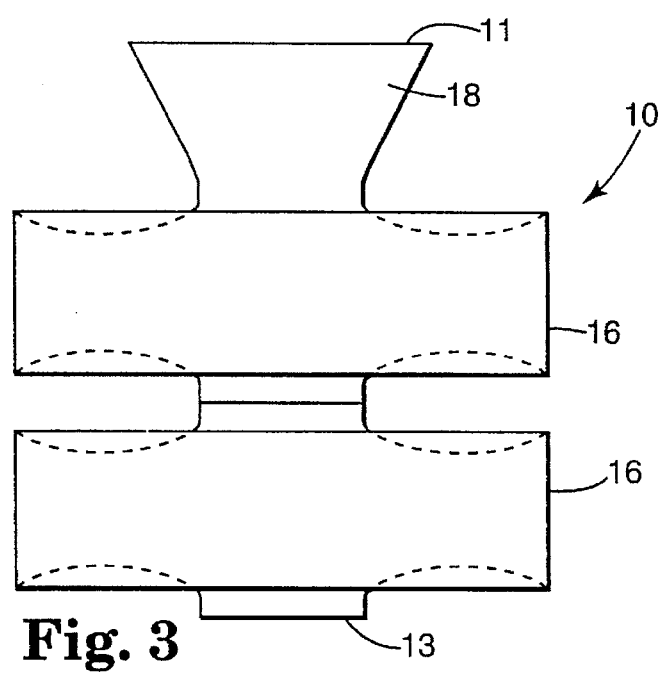
FIG. 3 is a schematic view of a horn according to the invention having multiple weld faces in series.
Figure 4:
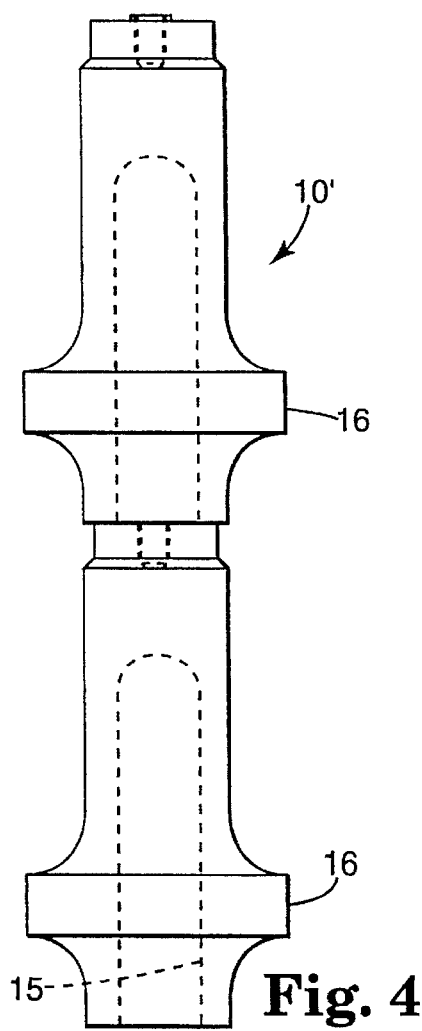
FIG. 4 is a schematic view of a horn according to another embodiment of the invention having multiple weld faces in series.
Figure 5:
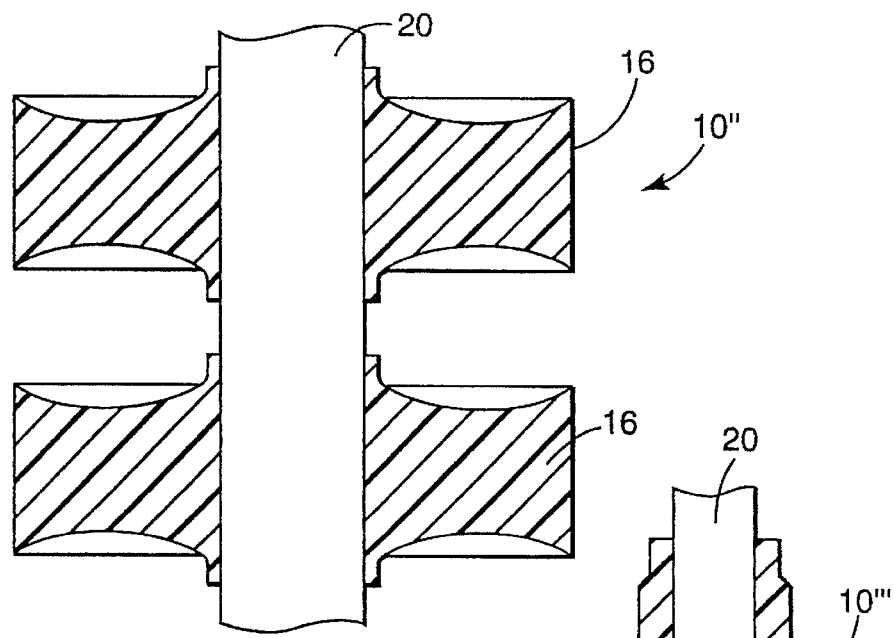
FIG. 5 is a schematic view of a horn similar to that of FIG. 3 having multiple weld faces in parallel.
Figure 6:
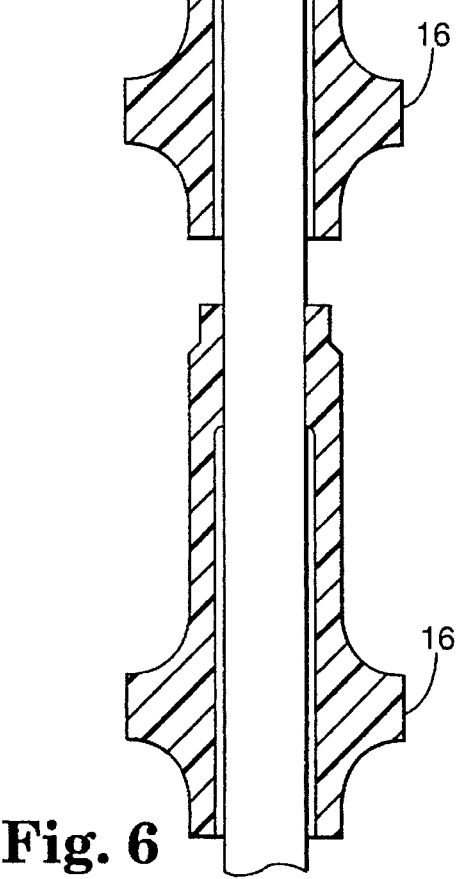
FIG. 6 is a schematic view of a horn similar to that of FIG. 4 having multiple weld faces in parallel.

The rotary horn of this invention can be a full wavelength, acoustic rotary horn, as shown in FIGS. 1, 4 and 6, or a half wavelength horn, as shown in FIGS. 2, 3 and 5. As shown, the horn is an ultrasonic horn and imparts energy at a selected wavelength, frequency, and amplitude. The horn can ultrasonically weld parts over a relatively long width with a desired amplitude.

For the full wavelength horn, the radial motion is in phase with the excitation and the horn has two nodal points for the axial motion and two nodal points for the radial motion. For the half wavelength horn, the radial motion is out of phase with the excitation and the horn has one nodal point for the axial motion and one nodal point for the radial motion.

Referring to FIG. 3, the rotary horn 10 has an axial input end 11 and an axial output end 13. A plurality of weld faces 16 are located on the horn 10. In FIGS. 1, 4, and 6, the horn 10 can have a hollow portion 15 which can extend for more than half of the axial length of the horn 10 and can be longer than the weld face 16.

The weld face diameter can be greater than the diameter of the rest of the horn 10. Each weld face 16 has a diameter that expands and contracts with the application of ultrasonic energy.

The gain (ratio of horn output amplitude to horn input amplitude based on the axial input) can be changed at the weld face 16 by changing the mass 18 at the input end 11 of the horn.

To weld on an anvil with a width more than the width of the weld face 16 without using multiple rotary horns (whether on rotary or flat anvils), the horns having multiple weld faces 16 can be used, or single weld face horns can be stacked along their length in a single unit. The configuration would look similar to a "shish-kabob" structure.

Figure 7:
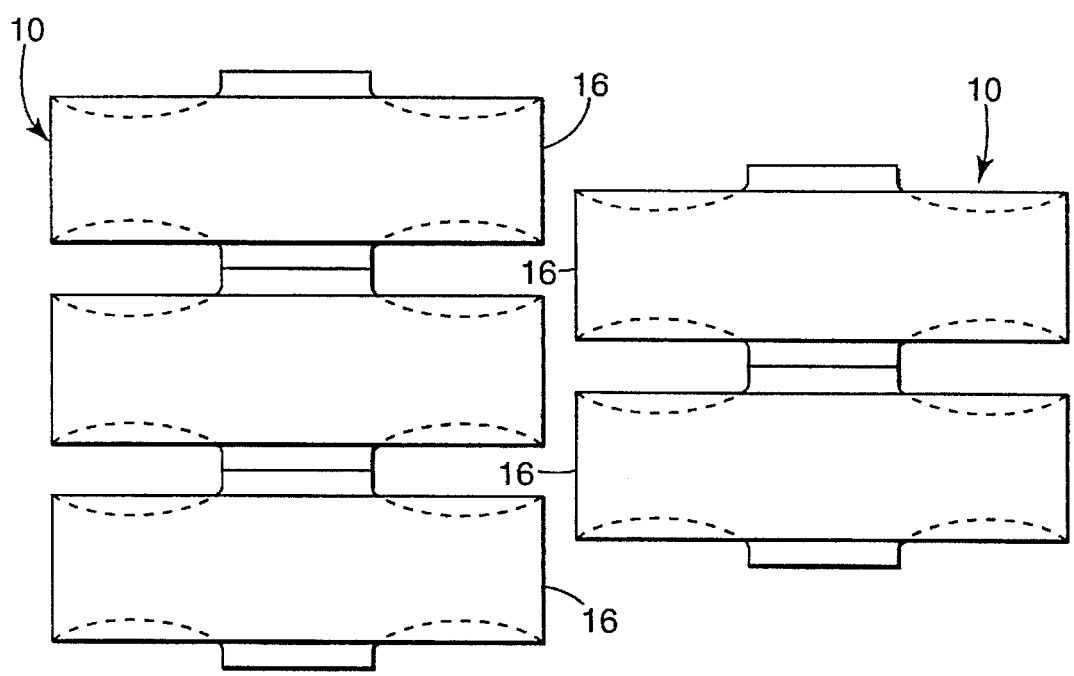
FIG. 7 is a schematic view of two staggered horns of FIG. 5.

The distance between the midpoints of adjacent weld faces 16 can be one or more multiples of one-half wavelength of the horn material. Also, the amplitude of vibration of each weld face can differ from the amplitude of vibration of adjacent weld faces. This horn assembly configuration can be actuated and rotated with a single power supply, booster, converter, and drive system. To cover completely the wider width of the anvil, two or more of these configurations, staggered by a distance up to the width of the weld face can be used, as shown in FIG. 7. The weld faces on each horn can have widths different from that of the weld faces on the other horn.

The weld faces can be mounted in series with each other, as shown by horns 10 and 10' in FIGS. 3 and 4, or in parallel with each other, as shown by horns 10" and 10'" in FIGS. 5 and 6. FIGS. 3 and 4 are examples of horns stacked in series. The configuration is classified as stacking the rotary horn in series because the output of one horn in the axial direction becomes the input to the next horn. The first horn drives the second rotary horn and so on. In FIG. 3, the axial length of the horn is multiple of one-half wavelength of the horn material. The distance between the center of successive weld faces is one-half wavelength of the horn material. The radial motion of alternate weld faces can be out of phase with the excitation and the horn exhibits one axial nodal point for every weld face.

In FIG. 4, the axial length of the horn is a multiple of one wavelength of the horn material. The distance between the center of successive weld faces is one wavelength of the horn material. The radial motion of each weld face is in phase with the excitation and the horn exhibits two axial nodal points for every weld face.

The configuration shown in FIGS. 3 and 4 can be made by stacking individual horns or by machining a single, integrally formed, one-piece structure.

FIGS. 5 and 6 show the rotary horns stacked in parallel. In these figures, two or more rotary horns are stacked along their length using a resonating rod 20. This configuration is a parallel system because the main driving or input source is the cylindrical rod that connects these rotary horns. In this rotary horn configuration, each weld face can be driven independently of the adjacent weld face.

The features of the horn of FIGS. 1–6 can be combined in any way, mixing and matching features and components to form many different configurations.

The length of a horn with multiple weld faces is a multiple of the wavelength of the horn material being used. The location of the successive weld faces is at a distance (center-to-center distance between adjacent weld faces) of one-half wavelength of the horn material for the horns of FIGS. 3 and 5. The center-to-center distance for the horns of FIGS. 4 and 6 is one wavelength of the horn material. If desired, intermediate weld faces can be eliminated so that the weld faces are positioned at full wavelength of the horn material for the horns of FIGS. 3 and 5.

The configuration of FIGS. 5 and 6 can be made by stacking individual horns or by using a single, integrally formed of one piece structure.

To cover a wider weld width, one can stagger several multiple weld face rotary horns of any configuration as shown in FIG. 7. This minimizes the number of stacked horns that must be used and in turn reduces the number of accessories, such as converters, boosters, power supplies, and drive systems, necessary to accommodate increased anvil widths. This also reduces the maintenance and assembly of the whole configuration.

The horn and the weld face can be concentric cylinders of constant diameter. However, they could have varying radii or be non-concentric, and the welding portion need not be cylindrical to work with various welding configurations. For example, the welding portion could be a non-cylindrical conic section. It could be elliptical in the radial direction or can be spherical.

We claim:

1. A rotary acoustic horn for imparting energy at a selected wavelength, frequency, and amplitude, wherein the horn comprises:

a base portion having an axial input end and an axial output end;

a plurality of weld faces operationally connected to the base portion, each having a diameter that is greater than the diameter of the base portion and that expands and contracts with the application of acoustic energy to the input end of the base portion, wherein the weld faces are spaced from each other, and wherein the weld faces are mounted in one of series and parallel with each other.

2. The horn of claim 1 wherein the distance between midpoints of adjacent weld faces is at least one multiple of one-half wavelength of the horn material.

3. The horn of claim 1 wherein the amplitude of vibration of each weld face differs from the amplitude of vibration of adjacent weld faces.

4. The horn of claim 1 wherein the axial length of the horn is substantially equal to one or more multiples of one-half wavelength of the horn material.

5. The horn of claim 4 wherein the base portion is hollow for at least part of its axial length.

6. The horn of claim 1 wherein the base portion is cylindrical, the weld face is cylindrical, and the weld face is coaxial with the base portion.

7. The horn of claim 1 wherein at least one weld face expansion and contraction moves substantially in phase with the movement of the axial input end of the horn.

8. The horn of claim 7 wherein each weld face expansion and contraction moves substantially in phase with weld face expansion and contraction of alternate weld faces.

9. The horn of claim 1 which is an ultrasonic horn.

10. The horn of claim 1 further comprising means for changing the gain at the radial weld face by changing the mass at the axial input end of the horn.

11. A rotary acoustic horn setup for imparting energy at a selected wavelength, frequency, and amplitude, wherein the setup comprises first and second horns and wherein each horn comprises:

a base portion having an axial input end and an axial output end; a plurality of weld faces operationally connected to the base portion, each having a diameter that is greater than the diameter of the base portion and that expands and contracts with the application of acoustic energy to the input end of the base portion, wherein the weld faces are spaced from each other, and wherein the weld faces are mounted in one of series and parallel with each other;

wherein the weld faces on the first horn are staggered, with respect to adjacent weld faces on the second horn, by a distance sufficient to cover completely a width of an anvil against which welding occurs.

* * * * *

REEXAMINATION CERTIFICATE (4018th)

United States Patent [19]
Gopalakrishna et al.

[11] B1 5,645,681
[45] Certificate Issued Mar. 14, 2000

[54] STACKED ROTARY ACOUSTIC HORN

[75] Inventors: Haregoppa S. Gopalakrishna; Satinder K. Nayar, both of Woodbury, Minn.

[73] Assignee: Minnesota Mining and Manufacturing Company, St. Paul, Minn.

Reexamination Request:
No. 90/005,397, Jul. 8, 1999

Reexamination Certificate for:
Patent No.: 5,645,681
Issued: Jul. 8, 1997
Appl. No.: 08/676,050
Filed: Jul. 5, 1996

[51] Int. Cl.[7] .................................................. B29C 65/08
[52] U.S. Cl. ................... 156/580.2; 156/73.1; 425/174.2
[58] Field of Search .................................. 156/73.1, 555, 156/580, 580.1, 580.2; 425/174.2; 228/110.1, 1.1

[56] References Cited

U.S. PATENT DOCUMENTS

| | | | |
|---|---|---|---|
| 4,252,586 | 2/1981 | Scott | 156/73.1 |
| 4,404,052 | 9/1983 | Persson et al. | 156/73.1 |
| 4,473,432 | 9/1984 | Leader et al. | 156/582 |
| 4,534,818 | 8/1985 | Kreager et al. | 156/466 |
| 4,659,614 | 4/1987 | Vitale | 428/218 |
| 4,668,316 | 5/1987 | Sager | 156/73.1 |
| 4,681,645 | 7/1987 | Fukushima et al. | 156/73.1 |
| 5,057,182 | 10/1991 | Wuchinich | 156/580.1 |
| 5,087,320 | 2/1992 | Neuwirth | 156/580.2 |
| 5,096,532 | 3/1992 | Neuwirth et al. | 156/580.1 |
| 5,110,403 | 5/1992 | Ehlert | 156/580.1 |
| 5,552,013 | 9/1996 | Ehlert et al. | 156/555 |
| 5,562,790 | 10/1996 | Ehlert et al. | 156/73.1 |

FOREIGN PATENT DOCUMENTS

| | | |
|---|---|---|
| 2082090 | 11/1971 | France . |
| 2282559 | 4/1995 | United Kingdom . |

OTHER PUBLICATIONS

Translation of French Patent No. 2,082,090, Nov. 15, 1971, Scotto.

*Primary Examiner*—James Sells

[57] ABSTRACT

A rotary acoustic horn imparts energy at a selected wavelength, frequency, and amplitude. The horn includes a base portion and a plurality of weld faces. Each weld face has a diameter that expands and contracts with the application of ultrasonic energy. The weld faces are spaced from each other and are mounted in one of series and parallel with each other.

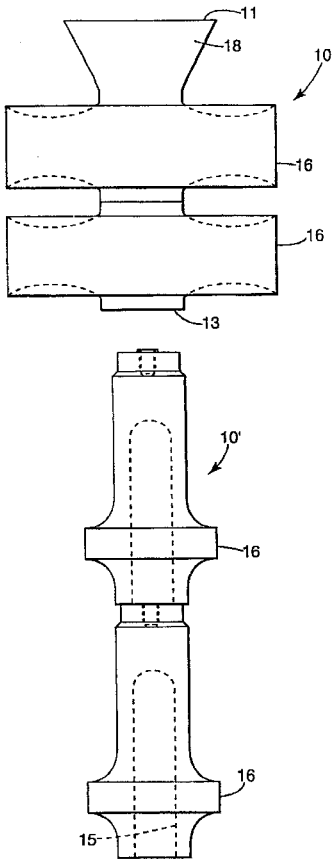

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 11 is confirmed.

Claim 1 is determined to be patentable as amended.

Claims 2–10, dependent on an amended claim, are determined to be patentable.

1. A rotary acoustic horn for imparting energy at a selected wavelength, frequency, and amplitude, wherein the horn comprises:
    a base portion having an axial input end and an axial output end;
    a plurality of weld faces operationally connected to the base portion, each having a diameter that is greater than the diameter of the base portion and that expands and contracts with the application of acoustic energy to the input end of the base portion, wherein the weld faces are spaced from each other, and wherein the weld faces are mounted in [one of series and] parallel with each other.

* * * * *